United States Patent
Negoro et al.

(10) Patent No.: US 7,138,774 B2
(45) Date of Patent: Nov. 21, 2006

(54) VEHICLE CONTROL UNIT AND VEHICLE

(75) Inventors: Masanori Negoro, Shizuoka (JP); Nobuo Hara, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 52 days.

(21) Appl. No.: 11/197,630

(22) Filed: Aug. 4, 2005

(65) Prior Publication Data
US 2006/0061312 A1 Mar. 23, 2006

(30) Foreign Application Priority Data

| | | | |
|---|---|---|---|
| Aug. 5, 2004 | (JP) | | 2004-228942 |
| Sep. 15, 2004 | (JP) | | 2004-268085 |

(51) Int. Cl.
 *A63C 17/12* (2006.01)
(52) U.S. Cl. ............ 318/139; 318/565; 318/567; 180/181
(58) Field of Classification Search ........... 318/139, 318/565–567, 580, 587, 432–434; 180/180, 180/181, 218–220
See application file for complete search history.

(56) References Cited

U.S. PATENT DOCUMENTS

| | | | | |
|---|---|---|---|---|
| 5,487,441 A | * | 1/1996 | Endo et al. | 180/181 |
| 6,050,357 A | * | 4/2000 | Staelin et al. | 180/65.1 |
| 6,288,505 B1 | * | 9/2001 | Heinzmann et al. | 318/139 |
| 6,828,916 B1 | * | 12/2004 | Rains et al. | 340/665 |
| 6,868,931 B1 | * | 3/2005 | Morrell et al. | 180/170 |
| 6,915,878 B1 | * | 7/2005 | Kamen et al. | 182/141 |
| 2005/0160902 A1 | | 7/2005 | Iwai et al. | |
| 2005/0211078 A1 | | 9/2005 | Iwai et al. | |
| 2005/0242538 A1 | | 11/2005 | Hiramatsu | |

FOREIGN PATENT DOCUMENTS

| | | |
|---|---|---|
| JP | 09-010375 | 1/1997 |
| JP | 10-023613 | 1/1998 |
| JP | 10-211313 | 8/1998 |
| JP | 10-313502 | 11/1998 |
| JP | 10-314366 | 12/1998 |
| JP | 2000-140190 | 5/2000 |
| JP | 2003-237670 | 8/2003 |
| WO | WO 2005/014128 A1 | 2/2005 |

OTHER PUBLICATIONS

Nobuo Hara. U.S. Appl. No. 10/538,987, filed Aug. 5, 2005. "Vehicle."

* cited by examiner

*Primary Examiner*—Bentsu Ro
(74) *Attorney, Agent, or Firm*—Keating & Bennett, LLP (57) ABSTRACT

A control unit controls a vehicle having a body to allow its user to step on, a power generator arranged to generate power that drives the body, and a load sensor unit arranged to output a load value representing a load that has been applied to the body. The control unit preferably includes a first memory arranged to store a load threshold value, a second memory arranged to store a plurality of data, which respectively correspond to different types of control processing to control the power generator, and a processor arranged to change to a type of control processing among the different types of control processing according to a result of a comparison between the load value and the load threshold value. The processor controls the power generator based on one of the plurality of data corresponding to the type of control processing.

17 Claims, 10 Drawing Sheets

VEHICLE CONTROL UNIT AND VEHICLE

BACKGROUND OF THE INVENTION

1. Field of the Invention

The present invention relates to an apparatus for controlling a vehicle such as a motorized skateboard and also relates to a vehicle equipped with such a control unit. More particularly, the present invention relates to driving control of such a vehicle while the user is stepping on/off the vehicle or riding the vehicle.

2. Description of the Related Art

Motorized skateboards, motorized surfboards, motorized wheelchairs and other vehicles have been known as motorized vehicles that are driven by an electric motor. The user of such a motorized vehicle can control the velocity of (i.e., accelerate or decelerate) the vehicle or change the direction of travel from forward to backward, or vice versa, by manually operating a throttle lever, a joystick or any other control lever.

However, while driving such a motorized vehicle that requires manual operation, the user is apt to pay too much attention to the operation to drive it comfortably. Also, if such a manual operation member is provided, then the user can change his or her riding position less freely.

Japanese Patent Application Laid-Open Publication No. 10-23613 discloses a motorized vehicle that does not require the user to perform such a manual operation. In the motorized vehicle disclosed in the Japanese Patent Application Laid-Open Publication No. 10-23613, two pressure sensors, located at front and rear positions of a skateboard, each sense the given load (i.e., the weight of the user). Then, based on the difference between the load values detected by these sensors, a motor is controlled and wheels are driven, thereby propelling the skateboard either forward or backward.

More particularly, this skateboard travels forward if the load placed on the front pressure sensor is heavier than that placed on the rear pressure sensor but travels backward if the load placed on the front pressure sensor is lighter than that placed on the rear pressure sensor. Also, this skateboard accelerates as the difference between the loads placed on the front and rear pressure sensors widens but decelerates as the difference narrows.

Generally speaking, however, it is not easy for every user to control such a motorized skateboard just as he or she intends because he or she has to learn some skills to start or stop the skateboard without stumbling. That is to say, it usually takes a lot of time to master those skills of operation and to use such a motorized vehicle safely. This is because a conventional motorized skateboard that requires no manual operation often works against the will and intended action of the user while he or she is stepping on or off the board.

For example, if the user of a motorized skateboard puts his or her rear foot off the skateboard in order to stop the skateboard while riding it with both feet placed on the board, then the skateboard will accelerate against the will and intended action of the user. This is because in that situation, only the load that has been placed on the rear pressure sensor is removed and the difference between the loads placed on the front and rear pressure sensors increases. That is why it is difficult for the user to stop the skateboard by putting his or her rear foot off the board.

On the other hand, if the user puts one of his or her feet on the front portion of the motorized skateboard while the skateboard is stopped or at rest, then the skateboard will start abruptly. This is because only the load placed on the front pressure sensor increases and the difference between the loads placed on the front and rear pressure sensors increases.

SUMMARY OF THE INVENTION

In order to overcome the problems described above, preferred embodiments of the present invention provide an apparatus for controlling a vehicle so as to allow its user to start or stop the vehicle easily and safely.

A control unit according to a preferred embodiment of the present invention is preferably used for controlling a vehicle. The vehicle preferably includes a body to allow its user to step on, a power generator for generating power that drives the body, and a load sensing unit for outputting a load value representing a load that has been applied to the body. The control unit preferably includes a first memory for storing a load threshold value, a second memory for storing a plurality of data, which respectively correspond to different types of control processing to control the power generator, and a processor for changing to a certain type of control processing among the different types of control processing according to a result of a comparison between the load value and the load threshold value, wherein the processor controls the power generator based on one of the plurality of data corresponding to the type of control processing.

In one preferred embodiment of the present invention, the power generator of the vehicle may be able to generate power in accordance with a command value, and the processor may output the command value based on the data corresponding to the type of control processing after it has been changed.

In this particular preferred embodiment of the present invention, the processor may change to the type of control processing for generating the power, thereby outputting a command value that is different from another command value associated with a stopped state.

In that case, the command value output by the processor may change in a stepwise manner.

In an alternative preferred embodiment of the present invention, the processor may change to another type of control processing for stopping generation of the power, thereby outputting a command value associated with a stopped state.

In another preferred embodiment of the present invention, the first memory may store a step-on-board threshold value as the load threshold value. When the load value exceeds the step-on-board threshold value, the processor may change to the type of control processing for generating the power.

In this particular preferred embodiment of the present invention, the first memory may further store a step-off-board threshold value that is smaller than the step-on-board threshold value. When the load value becomes smaller than the step-off-board threshold value, the processor may change to the type of control processing for stopping generation of the power.

In still another preferred embodiment of the present invention, the load sensing unit may include a plurality of sensors, which are located at mutually different positions on the body so as to output load values representing loads at the respective positions, and the first memory may store a plurality of load threshold values that are defined for the respective sensors. The processor may compare the load value supplied from each of the sensors with an associated one of the load threshold values.

In a specific preferred embodiment of the present invention, the first memory may store first and second step-onboard threshold values as the load threshold values, and the load sensing unit may include a first sensor and a second sensor. When it is determined that the load value detected by the first sensor exceeds the first step-on-board threshold value and also it is determined that the load value detected by the second sensor exceeds the second step-on-board threshold value as a result of the comparison, the processor may change to the type of control processing for generating the power.

In an alternative preferred embodiment of the present invention, the first memory may store first and second step-off-board threshold values as the load threshold values, and the load sensing unit may include a first sensor and a second sensor. When it is determined that the load value detected by the first sensor is equal to or smaller than the first step-off-board threshold value and/or it is determined that the load value detected by the second sensor is equal to or smaller than the second step-off-board threshold value as a result of the comparison, the processor may change to the type of control processing for stopping generation of the power.

In a specific preferred embodiment of the present invention, the power generator of the vehicle may drive the body in a direction and at a velocity as determined by the command value. The processor may calculate the bias of the loads based on the load values that have been detected by the first and second sensors and may change the command value according to the bias.

A vehicle according to a preferred embodiment of the present invention preferably includes a body to allow its user to step on, a power generator for generating power that drives the body, a load sensing unit, being provided with the body, for outputting a load value representing a load that has been applied to the body, and a control unit. The control unit preferably includes a first memory for storing a load threshold value, a second memory for storing a plurality of data, which respectively correspond to different types of control processing to control the power generator, and a processor for changing to a type of control processing among the different types of control processing according to a result of a comparison between the load value and the load threshold value. The processor controls the power generator based on one of the plurality of data corresponding to the type of control processing.

In one preferred embodiment of the present invention, the vehicle may further include a first wheel and a second wheel that support the body and at least one of the first and second wheels may be dynamically coupled to the power generator.

In another preferred embodiment of the present invention, the body may have a board shape and may be elongated in a direction in which the first and second wheels are arranged.

In yet another preferred embodiment of the present invention, the first and second wheels may be arranged so as to face each other with respect to the center of the body.

In yet another preferred embodiment of the present invention, the power generator may drive the body in the direction in which the first and second wheels are arranged.

In another preferred embodiment of the present invention, the vehicle may be implemented as a skateboard.

According to a preferred embodiment of the present invention, a load value representing a load that has been applied to the body and a load threshold value are compared with each other and a type of control processing is carried out according to a result of the comparison. That is to say, instead of controlling the power generator by utilizing only the difference between the loads placed by the both feet of the user, a proper type of control processing is carried out adaptively based on the comparison between the load value and the load threshold value and depending on whether the user is on-board or off-board. As a result, the user can start and stop the vehicle easily and safely. For example, the vehicle never starts abruptly before the user puts both of his or her feet on the body. Also, even if the user has put just one of his or her feet off the vehicle, the vehicle never accelerates steeply.

According to a preferred embodiment of the present invention, a processor preferably calculates the bias of the load that has been given on a body based on first and second load values that have been detected by first and second sensors, respectively, and preferably outputs a command value associated with that bias. This bias of the load is determined by the distribution of the first and second load values irrespective of the user's weight. And a command value, associated with that bias, is output. As a result, the velocity of a vehicle can be controlled just as intended no matter how heavy the user may be.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of a vehicle according to the present invention will be described with reference to the accompanying drawings. In the following illustrative preferred embodiments, the vehicle is preferably implemented as a motorized skateboard but this is in no way limiting of the present invention.

Figure 1:
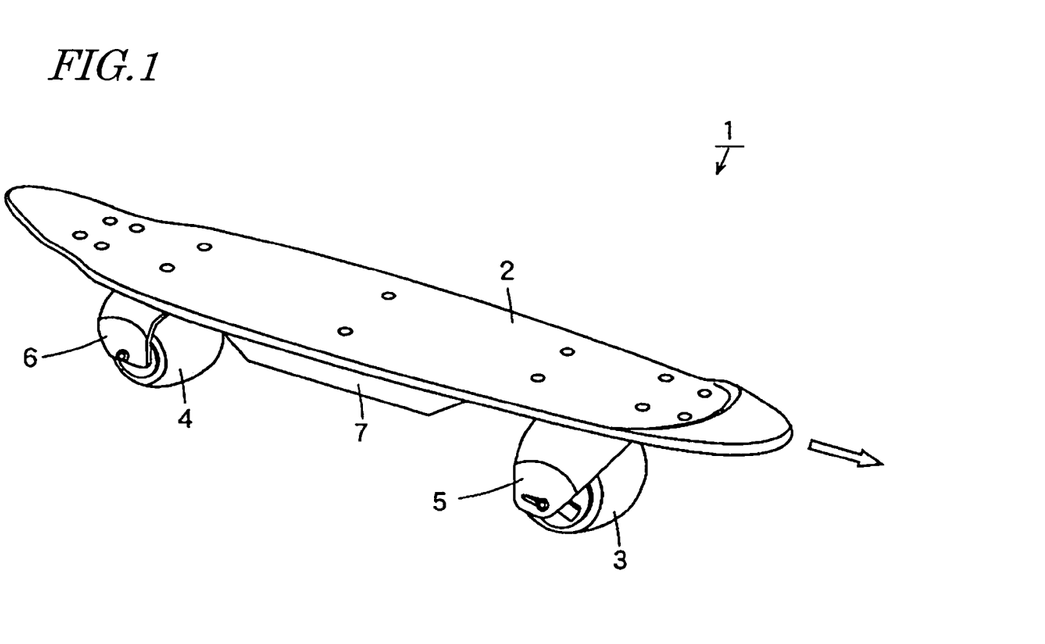
FIG. 1 schematically illustrates the appearance of a motorized skateboard 1 according to a preferred embodiment of the present invention.

FIG. 1 schematically illustrates the appearance of a motorized skateboard 1 according to a preferred embodiment of the present invention. The motorized skateboard 1 preferably includes a board body 2, a front wheel 3, a rear wheel 4, supporting members 5, 6 and a protective jacket 7.

When the user steps on the board body 2, the motorized skateboard 1 determines a load value by using one or more sensors (not shown). The motorized skateboard 1 compares the load value with a stored load threshold value (which will be simply referred to herein as a "threshold value") and carries out an appropriate type of processing based on the result of the comparison and depending on whether the user is on-board or off-board. For example, when it is determined that the load value increased from equal to or less than a step-on-board threshold value to more than the threshold value, the motorized skateboard 1 senses that the user is already on-board and performs starting processing. Meanwhile, when it is determined that the load value decreased from equal to or greater than a step-off-board threshold value to less than the threshold value, the motorized skateboard 1 senses that the user has stepped off the board and performs stopping processing.

When the starting or stopping processing is carried out according to the user's state, a drive signal is output to an electric motor (not shown). As a result, the motor is driven. That is to say, power associated with the on-board or off-board state is transmitted from the motor to the wheels. The motorized skateboard 1 never starts before the user puts both of his or her feet on the body when stepping on the board and stops immediately when the user just puts one of his or her feet off the board when stepping off the board.

Hereinafter, the respective members will be described one by one. The board body 2 is a portion on which the user rides either standing or squatting and may be made of a fiber reinforced plastic (FRP), wood or any other suitable material. The board body 2 preferably has an elongated board shape that connects the front and rear wheels 3 and 4 together. The motorized skateboard 1 travels generally parallel to the length direction of the board body 2.

The front and rear wheels 3 and 4 are fitted in a rotatable position with respect to the bottom of the board body 2 by way of the supporting members 5 and 6, respectively. The front wheel 3 and/or the rear wheel 4 may be made of rubber or a resin, for example, and may preferably have a raised center portion so that the user can turn or spin the skateboard 1 easily. The front and rear wheels 3 and 4 are preferably arranged so as to interpose the center of the board body 2 between them, and more preferably, so as to be approximately equally spaced apart from the center of the board body 2.

In the following description, the direction pointing from the rear wheel 4 toward the front wheel 3 of the motorized skateboard 1 (i.e., the direction pointed by the arrow in FIG. 1) will be referred to herein as the "forward direction". In this preferred embodiment, the front wheel 3 is supposed to be a free wheel to which no driving force is applied and the rear wheel 4 is supposed to be driving wheel. The structure of the front wheel 3 with the supporting member 5 and the structure of the rear wheel 4 with the supporting member 6 will be described more fully later with reference to FIGS. 2 and 3.

The protective jacket 7 is preferably arranged so as to cover and protect the motor control unit, battery, etc. (to be described later) such that these components do not get damaged even when the skateboard 1 collides against an obstacle or a protrusion.

Figure 2:
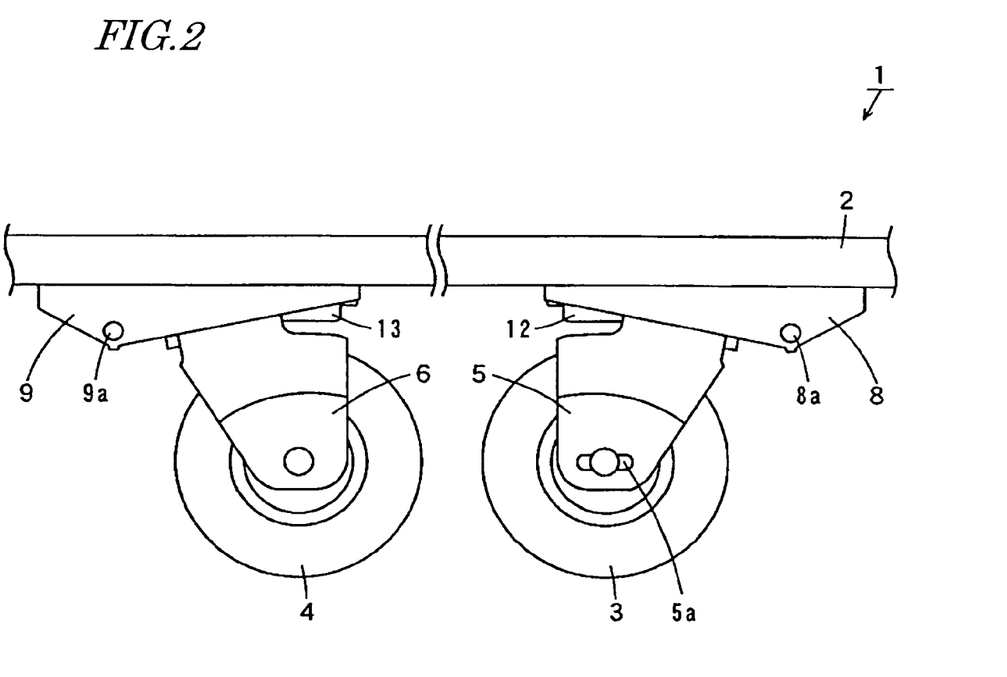
FIG. 2 is a schematic side view of the motorized skateboard 1.

FIG. 2 is a schematic side view of the motorized skateboard 1. As can be seen from FIG. 2, an outer frame 8 is fixed to the front bottom portion of the board body 2, while an outer frame 9 is fixed to the rear bottom portion of the board body 2. An inner frame 12 is secured in a rotatable position to the outer frame 8 by way of a shaft 8a that extends horizontally. On the other hand, an inner frame 13 is secured in a rotatable position to the outer frame 9 by way of a shaft 9a that extends horizontally.

The supporting members 5 and 6 are preferably secured to the inner frames 12 and 13, respectively. The front wheel 3 is rotatably supported by the supporting member 5 and the rear wheel 4 is rotatably supported by the supporting member 6.

The supporting member 5 preferably has a pair of substantially elliptical elongate holes 5a, of which the major-axis direction is substantially parallel to the length direction of the motorized skateboard 1. By modifying the fixing position of the front wheel 3 with respect to these elongate holes 5a, the degree of spinning ability of the motorized skateboard 1 can be adjusted.

Figure 3:
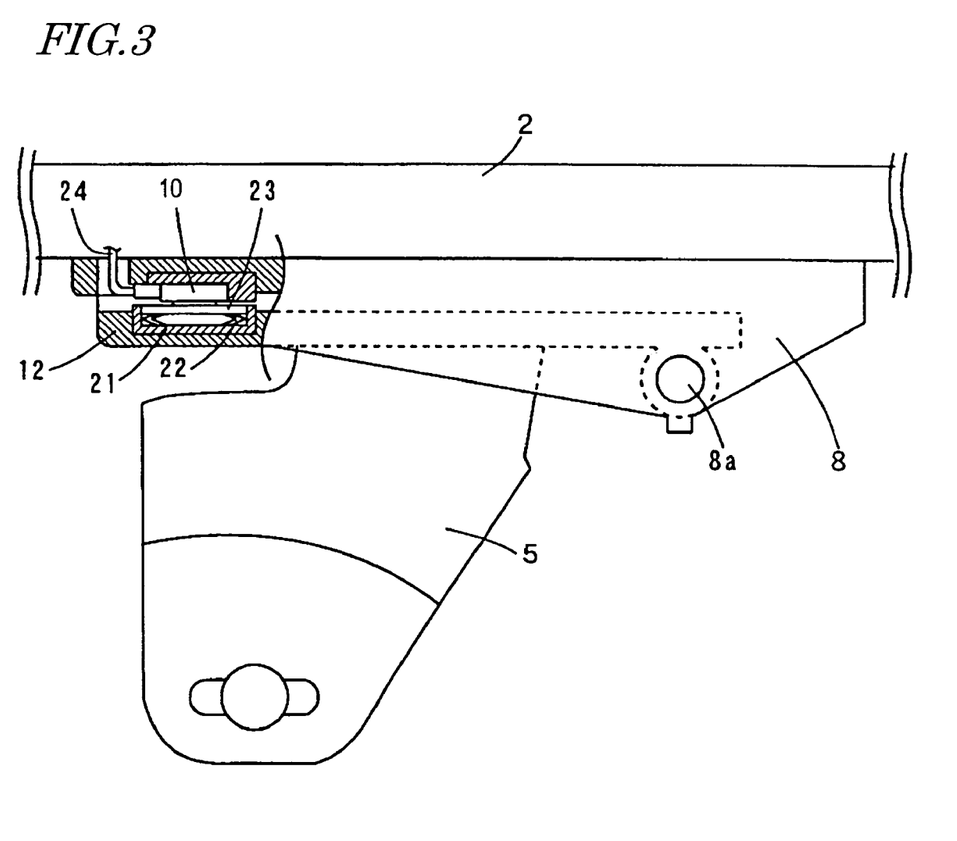
FIG. 3 illustrates a part of a side surface of the motorized skateboard 1 on a larger scale.

FIG. 3 illustrates, on a larger scale, a portion where the board body 2 and the supporting member 5 are joined together along with a partial cross section of the outer frame 8.

The inner frame 12 preferably includes a holder 21, in which a shock absorbing member 22 such as a plate spring is fitted. A spacer 23 made of aluminum, for example, is provided over the shock absorbing member 22. The inner frame 12 is preferably arranged so as to turn around the shaft 8a with respect to the outer frame 8.

Also, a front load sensor 10 (which will be referred to herein as a "front sensor") is attached to the outer frame 8 so as to face the spacer 23. The front sensor 10 can detect a load that has been applied from the board body 2.

As used herein, "to detect a load" means that the front sensor 10 outputs a load value representing the load applied. The load value does not have to be expressed in kilograms, pounds, or any other weight unit but may also be a current or voltage value representing the magnitude of the given load.

In this preferred embodiment, the front sensor 10 is preferably implemented as a strain gauge load cell but other suitable sensors may be used. The strain gauge load cell converts a strain, which is produced when its material is pressed with an externally applied load, into an electrical signal, and then outputs a value of the electrical signal as a load value. It should be noted that the strain gauge load cell and its location are just examples and are in no way limiting of the present invention. Another example will be described later with reference to FIG. 10.

Also, the "load that has been applied from the board body 2" to be detected by the front sensor 10 means herein the load actually applied to the front wheel 3 in the overall weight of the board body 2 and the motor, battery and other equipment attached thereto if the user is still off-board. On the other hand, if the user is already on-board, the "load" is one actually applied to the front wheel 3 in the overall weight of the board body 2, the motor, battery and other equipment, and the rider himself or herself.

Under the front sensor 10, the spacer 23 and the shock absorbing member 22 are arranged as described above. These members are provided to prevent an excessive load from being applied to the front sensor 10.

A conductive wire 24 is preferably connected to the front sensor 10 at one terminal thereof. The other terminal of the conductive wire 24 is preferably connected to a motor control unit (see FIG. 4). The output signal of the front sensor 10 representing a load value is supplied to the motor control unit through the conductive wire 24.

In this preferred embodiment, a rear load sensor 11 (which will be referred to herein as a "rear sensor") is further attached to the outer frame 9 (see FIG. 2). The rear sensor 11 is also a strain gauge load cell and outputs a load value, too. However, the function and configuration of the rear sensor 11 are the same as those of the front sensor 10 and detailed description thereof will be omitted herein.

Hereinafter, a configuration for a drive system for driving the motorized skateboard 1 will be described with reference to FIG. 4.

Figure 4:
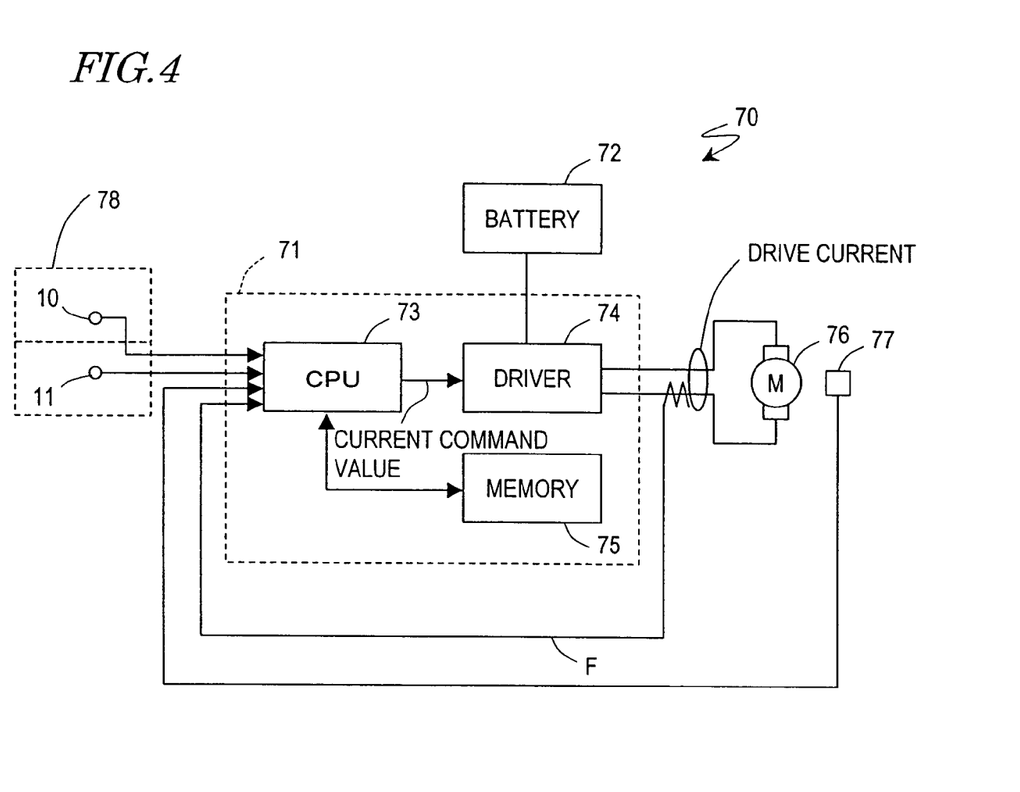
FIG. 4 is a block diagram showing a hardware configuration for a drive system 70 for the motorized skateboard 1.

FIG. 4 shows a hardware configuration for a drive system 70 of the motorized skateboard 1. The drive system 70 preferably includes a motor control unit (MCU) 71, a battery 72, a drive motor 76, an encoder 77 and a load sensing unit 78. The load sensing unit 78 includes the front and rear sensors 10 and 11, of which the configuration and operation have already been described.

The functions and configurations of the respective components are as follows. First, the motor control unit 71 preferably operates by using the battery 72 as its power supply and compares the load value supplied from the load sensing unit 78 with an internally stored threshold value. The motor control unit 71 preferably carries out a type of processing based on the result of the comparison and depending on whether the user is on-board or off-board, thereby changing the signal value of the drive signal and outputting the signal to the drive motor 76. The rotational direction and velocity of the drive motor 76 are controlled in accordance with this drive signal.

As used herein, the "type of processing to be carried out depending on whether the user is on-board or off-board" refers to either starting processing to be carried out when the user is on the motorized skateboard 1 or stopping processing to be conducted when the user steps off the motorized skateboard 1. If the user is already on the motorized skateboard 1, the motor control unit 71 preferably calculates the bias of the loads being applied to the board body 2 (i.e., a load ratio) based on the load values and changes the value of the drive signal to be supplied to the drive motor 76 according to the degree of the bias. The motor control unit 71 preferably carries out any of these types of processing selectively. The motor control unit 71 changes the types of control processing of the motorized skateboard 1, more specifically, changes the types of driving processing of the drive motor 76. As a result, the motorized skateboard 1 is driven.

It should be noted that the bias of the load is calculated by reference to a midpoint between the two load sensing positions of the front and rear sensors 10 and 11 as a center point. In this preferred embodiment, the load sensing positions of the front and rear sensors 10 and 11 are located over the front and rear wheels 3 and 4, respectively (see FIG. 3), that are arranged so as to be approximately equally spaced apart from the center of the board body 2. That is why the midpoint between the two load sensing positions agrees with the center of the board body 2.

Next, the configuration of the motor control unit 71 will be described. The motor control unit 71 preferably includes a central processing unit (CPU) 73, a driver 74 and a memory 75.

The CPU 73 preferably receives respective load values from the front and rear sensors 10 and 11. In addition, the CPU 73 receives not only the output signal of the encoder 77 provided for the rear wheel 4 but also the drive signal (i.e., drive current) to the drive motor 76 by way of a feedback circuit F. The encoder 77 always detects the rotational direction and velocity of the rear wheel 4 and outputs the results of the detection. Based on these signals received, the CPU 73 sees if a drive control is accurately carried out in accordance with first and second maps (see FIG. 6A) to be described later.

Furthermore, the CPU 73 generates a pulse width modulated (PWM) current command value based on the sensing signals of the front and rear sensors 10 and 11 and supplies the value to the driver 74.

The driver 74 is preferably connected to the drive motor 76 that is provided in the rear wheel 4. The driver 74 preferably generates a drive current, of which the current value is determined by the current command value supplied from the CPU 73, and supplies the drive current to the drive motor 76. In response, the drive motor 76 preferably drives the rear wheel 4 in the direction and power corresponding to the current value of the drive current.

The memory 75 may be a RAM, an EEPROM or any other suitable storage device to store flags, parameters and other data required for processing.

Next, it will be described how the motorized skateboard 1 operates under the drive control performed by the motor control unit 71. This motorized skateboard 1 is designed such that if the user has stepped on the skateboard 1 in a stopped state without biasing the load, then the CPU 73 generates a positive current command value. The skateboard 1 is also designed such that even if the user has shifted his or her weight forward on the board body 2, the current command value also becomes positive. As a result, only a force in the forward rotational direction is transmitted from the drive motor 76 to the rear wheel 4, thereby propelling the motorized skateboard 1 forward.

Furthermore, this skateboard 1 is designed such that if the user has shifted his or her weight backward on the board body 2, the current command value becomes negative. As a result, only a force in the backward rotational direction is transmitted from the drive motor 76 to the rear wheel 4, thereby propelling the motorized skateboard 1 backward.

Meanwhile, this skateboard 1 is also designed such that the CPU 73 generates a current command value of zero once the user has moved even one of his or her feet off the motorized skateboard 1. As a result, the force transmitted from the drive motor 76 also becomes zero and the motorized skateboard 1 finally stops due to the rotational resistance of the rear wheel 4, for example.

Hereinafter, the drive control will be described more specifically with reference to FIGS. 5A, 5B, 6A and 6B. The forward or backward drive or stop of the motorized skateboard 1 is controlled based on a current command value calculated by this processing.

Figure 5A:
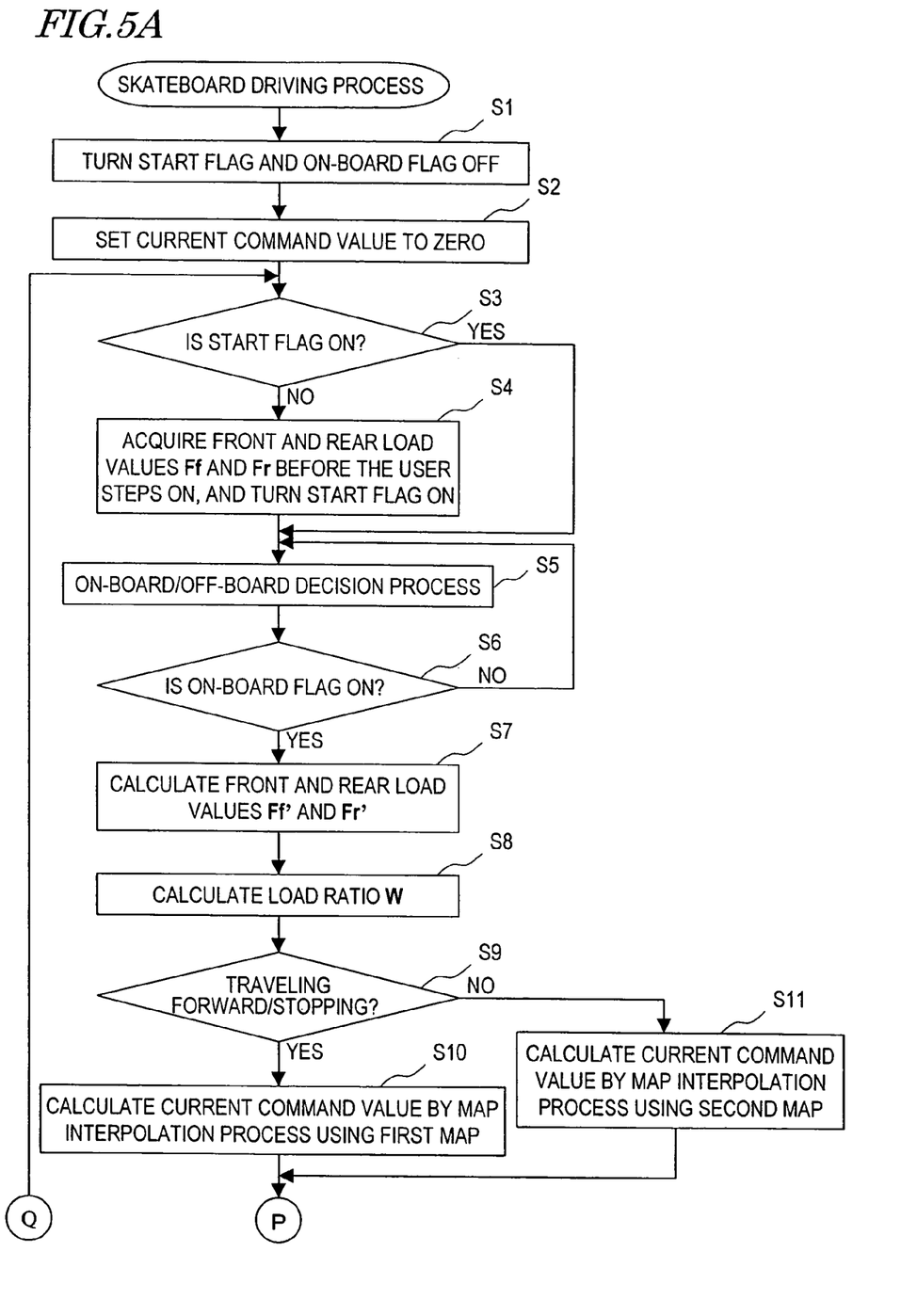
FIGS. 5A and 5B are a flowchart showing a procedure of processing of calculating a current command value and driving the motorized skateboard 1.
Figure 5B:
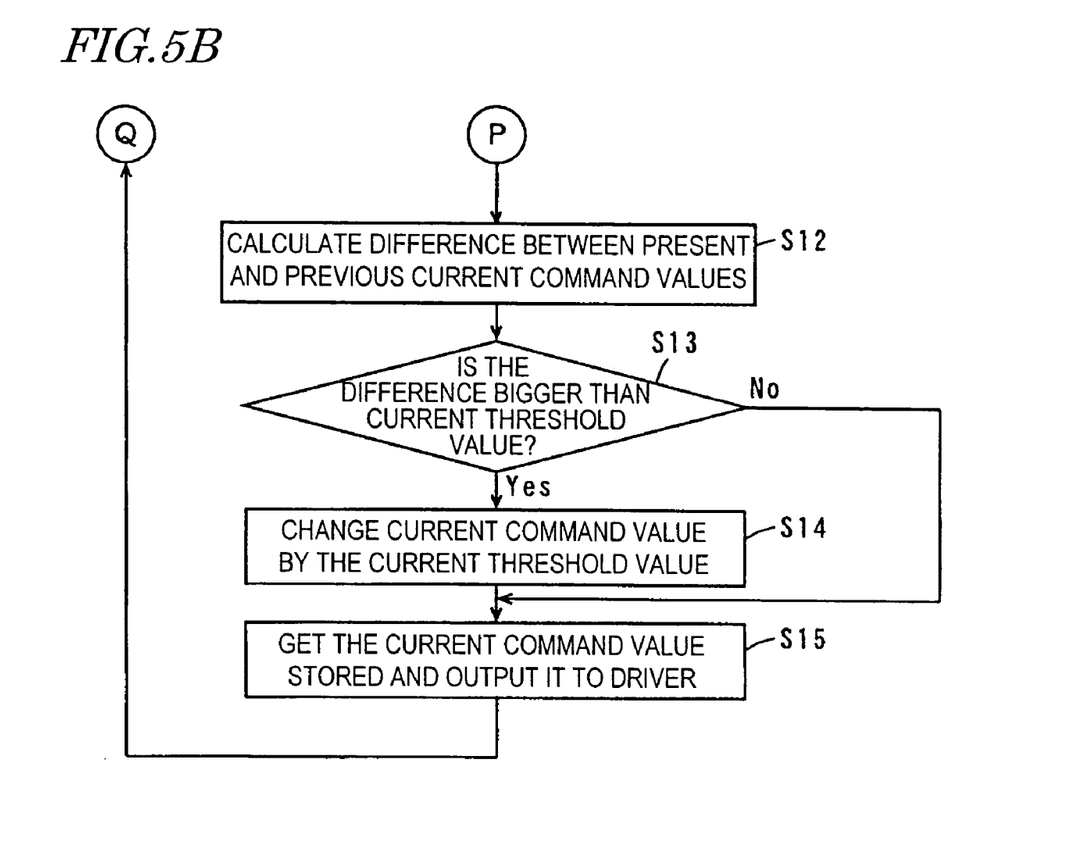

FIGS. 5A and 5B show a procedure of processing of calculating a current command value and driving the motorized skateboard 1. In the following description, the load value detected by the front sensor 10 will be referred to herein as a "front load value Ff" and the load value detected by the rear sensor 11 will be referred to herein as a "rear load value Fr".

First, referring to FIG. 5A, when a switch (not shown) provided for the board body 2 is turned ON, the processing starts. In Step S1, the CPU 73 initially turns off respective types of flags, including a start flag and an on-board flag, which are stored in the memory 75 shown in FIG. 4.

The start flag indicates whether or not it is ready to start the processing of calculating the current command value. More specifically, the start flag shows whether or not the front and rear load values Ff and Fr have been acquired while the user is still off the board body 2. On the other hand, the on-board flag indicates whether or not the user is on this motorized skateboard 1. That is to say, the on-board flag is turned on when the user is already on the skateboard 1.

Next, in Step S2, the CPU 73 sets the current command value for the driver 74 equal to zero. Then, in Step S3, the CPU 73 determines whether or not the start flag is ON. If the answer is NO, the process advances to Step S4. Otherwise, the process advances to Step S5.

In Step S4, the CPU 73 acquires the front load value Ff at that point in time as an initial value Ff0 from the front sensor 10 and also acquires the rear load value Fr at that point in time as an initial value Fr0 from the rear sensor 11. Then, the CPU 73 turns the start flag ON.

In the next step S5, the CPU 73 performs the on-board/off-board decision process. First, the CPU 73 determines, by an on-board flag, whether the user should be regarded as on-board or off-board. If the user should be regarded as off-board, the CPU 73 determines whether or not he or she has put both of his or her feet on the board. On the other hand, if the user should be regarded as on-board, the CPU 73 determines whether or not he or she has put at least one of his or her feet off the board. The on-board/off-board decision process will be described in further detail later with reference to FIGS. 7A, 7B and 8.

In Step S5 of the on-board/off-board decision process, when it is determined that the user has already put both of his or her feet on the board body 2, the on-board flag is turned ON. On the other hand, when it is determined that the user has already put at least one of his or her feet off the skateboard 1, the on-board flag is turned OFF.

Next, in Step S6, the CPU 73 determines whether or not the on-board flag is ON. If the answer is NO, then the CPU 73 goes back to the processing step S5 and repeatedly performs processing steps S5 and S6 until the on-board flag turns ON. On the other hand, if the answer is YES, the process advances to Step S7.

In Step S7, the CPU 73 acquires a current front load value Ff and a current rear load value Fr from the front sensor 10 and the rear sensor 11, respectively, and calculates a front load value Ff' and a rear load value Fr' by using the initial values Ff0 and Fr0 that have been obtained in Step S4. The front and rear load values Ff' and Fr' are given by the following Equations (1) and (2), respectively:

$$Ff'=Ff-Ff0 \quad (1)$$

$$Fr'=Fr-Fr0 \quad (2)$$

By figuring out the front and rear load values Ff' and Fr', only the load resulting from the user can be obtained. The remaining processing is carried out using these load values Ff' and Fr'.

According to Equations (1) and (2), the measuring errors of the sensors due to some variations with time can be calibrated. As to Equation (1), for example, the load values Ff and Ff0 include the same measuring error. That is why the measuring error is canceled by Equation (1). The same statement applies to the load values Fr and Fr0 in Equation (2). The front and rear load values Ff' and Fr' calculated by Equations (1) and (2) show the user's load with no measuring errors.

Next, in Step S8, the CPU 73 calculates a load ratio W. The load ratio W is given by the following Equation (3)

$$W=Ff'/(Ff'+Fr')-\tfrac{1}{2} \quad (3):$$

In this case, if the center of gravity of the user is located closer to the front edge than the center of the board body 2, then the load ratio W becomes positive. On the other hand, if the center of gravity of the user is located closer to the rear edge than the center of the board body 2, then the load ratio W becomes negative. If the center of gravity of the user is located at the center of the board body 2, then the load ratio W becomes equal to zero. That is to say, the load ratio W shows to what degree the load placed on the board body is biased. The load ratio W will be used in processing steps S10 and S11 to be described later.

The load ratio W is defined in order to perform a control operation without being affected by the user's weight. More specifically, if the velocity is controlled according to only the difference between the loads placed on the front and rear sensors, then the difference in weight between the users will make a big difference. That is to say, if the user is heavy, the difference between the loads placed on the front and rear sensors can be big enough to accelerate or decelerate the skateboard quickly. However, if the user is light, it is more difficult to widen the difference to such an extent as to accelerate or decelerate the skateboard quickly.

Optionally, the load ratio W may be calculated by the following Equation (4)

$$W=Fr'/(Ff'+Fr')-\tfrac{1}{2} \quad (4):$$

According to this Equation (4), if the center of gravity of the user is located closer to the front edge than the center of the board body 2, then the load ratio W becomes negative. On the other hand, if the center of gravity of the user is located closer to the rear edge than the center of the board body 2, then the load ratio W becomes positive.

Next, in Step S9, the CPU 73 determines whether the motorized skateboard 1 is now going forward, going backward or stopping. If the motorized skateboard 1 is going forward or stopping, the process advances to Step S10. On the other hand, if the motorized skateboard 1 is going backward, then the process advances to Step S11. The direction of travel can be specified by the velocity and direction of rotation that have been detected by the encoder 77, for example.

In Step S10, the CPU 73 performs a map interpolation process using a first map (to be described later), thereby calculating a current command value for the driver 74. In Step S11, on the other hand, the CPU 73 performs a map interpolation process using a second map (to be described later), thereby calculating a current command value for the driver 74. The first and second maps are stored in the memory 75. Depending on the type of processing that needs to be carried out, the CPU 73 selectively reads out one of the first and second maps from the memory 75. The processing that uses the first and second maps will be described more fully later with reference to FIGS. 6A and 6B. When the processing step S10 or S11 is done, the process advances to Step S12 of FIG. 5B.

In Step S12, the CPU 73 figures out the difference (or variation) between the present and previous current command values for the driver 74. As will be described later, the previous current command value is stored in the memory 75. It should be noted that the previous current command value is set to initial value "0" when the motorized skateboard 1 was turned ON. Subsequently, in Step S13, the CPU 73 determines whether or not the difference in current command value that has been figured out in Step S12 is greater than a predetermined current threshold value. If the answer is YES, then the process advances to Step S14. Otherwise (i.e., if the difference is equal to or smaller than the predetermined threshold value), the process advances to Step S15.

In Step S14, the CPU 73 changes the current command value by the current threshold value. More specifically, if the present current command value has increased from the previous one by at least the current threshold value, then the CPU 73 adds the current threshold value to the previous current command value and sets the sum as a new current command value. On the other hand, if the present current command value has decreased from the previous one by at least the current threshold value, then the CPU 73 subtracts the current threshold value from the previous current command value and sets the remainder as a new current command value. As can be seen easily from these process steps, the current threshold value represents the maximum allowable variation of the current command value.

Next, in Step S15, the CPU 73 gets the new current command value stored in the memory 75 and outputs the new current command value to the driver 74. In response, the driver 74 generates a drive current, having a current value corresponding to the current command value, and supplies it to the drive motor 76. As a result, the motorized skateboard 1 is driven. Thereafter, the process returns to the processing step S3 and the processing steps S3 through S15 are carried out over and over again.

According to the processing steps S12 through S14, if the absolute value of the difference between the present and previous current command values is equal to or smaller than the current threshold value, the current command value is not updated. However, if the absolute value of the difference exceeds the threshold value, then the current command value is changed by the current threshold value. Consequently, it is possible to prevent the motorized skateboard 1 from being accelerated or decelerated too steeply and to make the motorized skateboard 1 move smoothly.

Next, the map interpolation process to be carried out in the processing steps S10 and S11 will be described with reference to FIGS. 6A and 6B.

Figure 6A:
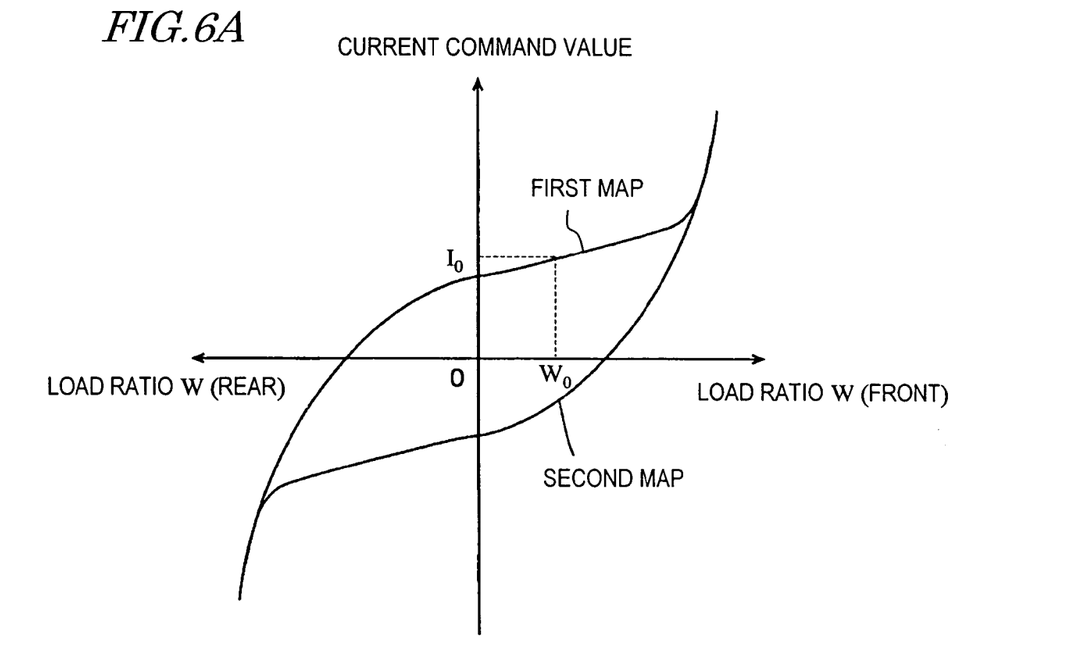
FIG. 6A shows first and second maps for use in a map interpolation process.

FIG. 6A shows the first and second maps for use in the map interpolation process. The first and second maps show a relationship between the load ratio W of the user and the current command value. In FIG. 6A, the abscissa represents the load ratio W calculated by the current command value calculating process and the ordinate represents the current command value given by the CPU 73 to the driver 74.

In the memory 75 shown in FIG. 4, a table of correspondence between the user's load ratio and the current command value is stored as the first and second maps. That is to say, each load ratio is associated with an address on the memory 75 and data representing a current command value is stored at each address. In FIG. 6A, each of the first and second maps is plotted as a continuous curve. Actually, however, only some discrete values need to be stored on the table so as to substantially match the load ratio calculating precision.

As can be seen from the curves showing the first and second maps, if the load ratio W is in the vicinity of zero, the current command value has a relatively small absolute value and each curve has a relatively small gradient. Meanwhile, as the absolute value of the load ratio W increases, the absolute value of the current command value also increases gradually and each curve has a relatively large gradient. If the absolute value of the load ratio W becomes extremely large (i.e., when the user steps on the front or rear end of the board body 2), the absolute value of the current command value increases steeply. Then, a huge driving force is generated.

A positive load ratio value means that the user's load is biased forward with respect to the center of the board body 2. In that case, a driving force in the forward rotational direction is transmitted to the rear wheel 4. As a result, the motorized skateboard 1 moves forward. On the other hand, a negative load ratio value means that the user's load is biased backward with respect to the center of the board body 2. In that case, a driving force in the reverse rotational direction is transmitted to the rear wheel 4. As a result, if the motorized skateboard 1 is now in a stopped state, the skateboard 1 starts to go backward. But if the motorized skateboard 1 is now going forward, the skateboard 1 is braked and eventually stops.

The first map shown in FIG. 6A is used for a control to be carried out when the motorized skateboard 1 is determined to be either stopping or going forward as a result of the processing step S9 (see FIG. 5A). On the other hand, the second map shown in FIG. 6A is used for a control to be carried out when the motorized skateboard 1 is determined to be going backward as a result of the processing step S9 (see FIG. 5A).

Next, it will be described with reference to FIG. 6B what current command value may be output when the motorized skateboard 1 is stopping. Suppose the user has stepped on the motorized skateboard 1 in the stopped state and his or her load value is calculated $W_0$ (>0) as shown in FIG. 6A. At the load ratio $W_0$, the current command value is $I_0$.

Figure 6B:
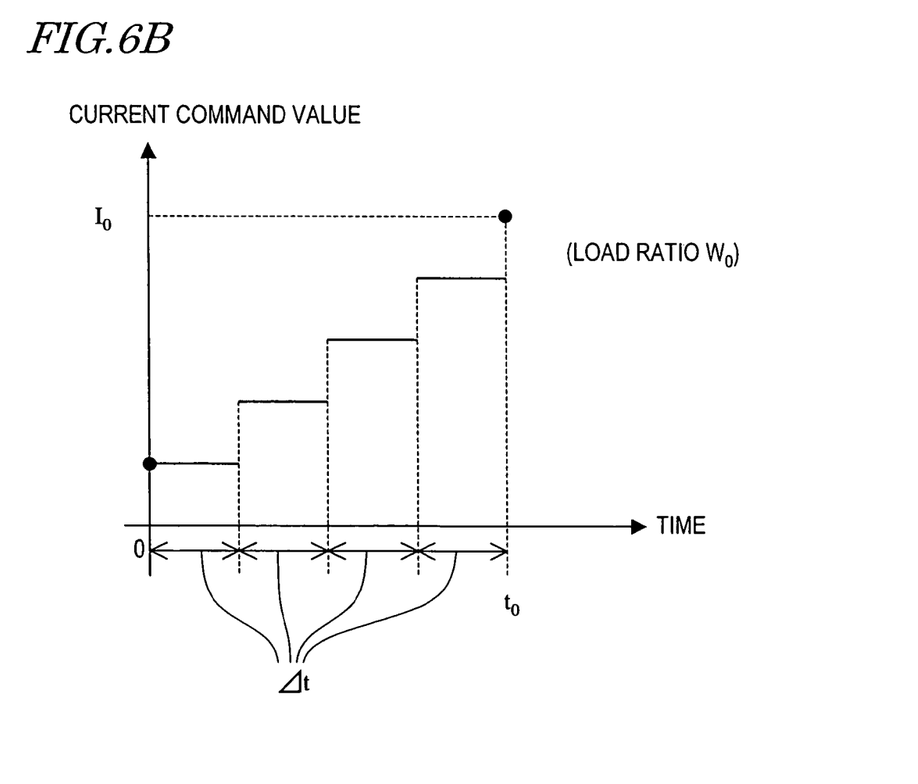
FIG. 6B shows exemplary current command values to output at regular time intervals $\Delta t$ such that those values change in a stepwise manner.

FIG. 6B shows exemplary current command values to output at predetermined time intervals $\Delta t$ (of 10 ms, for example) such that those values change stepwise. The CPU 73 controls the output of the current command values such that the current command value $I_0$ will be eventually output in an amount of time $t_0$. In other words, the CPU 73 does not immediately output the current command value $I_0$ to the driver 74. This is because if the current command value $I_0$ is given to the driver 74 so suddenly, then the driver 74 quickly generates a driving force responsive to that command value to start the motorized skateboard 1 abruptly, which gives an uncomfortable ride.

When the CPU 73 outputs the current command value with the waveform shown in FIG. 6B, the driver 74 generates a drive current, of which the current value changes in a stepwise manner, responsive to the current command value and supplies the drive motor 76 with such a current. As a result, the motorized skateboard 1 never starts abruptly and the user can use it both easily and safely. If the interval $\Delta t$ is narrowed, the step of variation in current command value can be further reduced. Then, the abrupt start can be avoided with even more certainty.

This control technique shares the same concept with the processing step S14 (see FIG. 5B). Accordingly, even if the motorized skateboard 1 is going forward or backward, immediate output of the current command value, which will cause an abrupt and steep change, is preferably regulated.

Instead of calculating the current command value to be supplied by the CPU 73 to the driver 74 using the first and second maps, the CPU 73 may figure out the current command value T by the following Equation (5)

$$T = K \cdot (Ff/(Ff+Fr)-\tfrac{1}{2}) + K_V \cdot V \tag{5}$$

where K and $K_V$ are predetermined coefficients and V is the velocity of the motorized skateboard 1. If this Equation (5) is adopted, there is no need to store the data of the first and second maps in the memory 75.

Next, the on-board/off-board decision process (i.e., the processing step S5 shown in FIG. 5A) will be described in detail with reference to FIGS. 7A, 7B and 8. In the following on-board/off-board decision process, the CPU 73 compares a plurality of threshold values and the load values transmitted from the front and rear sensors 10 and 11 with each other. It is possible to determine, based on the results of those comparisons, what the user has just done, and what he or she is doing now, on the skateboard 1.

In this preferred embodiment, a pair of threshold values THf1 and THr1 for determining whether or not the user who should be regarded as off-board has put both of his or her feet on the board and another pair of threshold values THf2 and THr2 for determining whether or not the user who should be regarded as on-board has put at least one of his or her feet off the board are supposed to be used as a plurality of threshold values. The following Table 1 summarizes the respective threshold values and their conditions of use. These threshold values are stored in the memory 75 and read out as required.

TABLE 1

| ID of threshold value | Associated load value is output by | Used when the user should be | Note |
|---|---|---|---|
| THf1 | Front sensor 10 | Off-board | Step-on-board threshold values* |
| THr1 | Rear sensor 11 | | |
| THf2 | Front sensor 10 | On-board | Step-off-board threshold values** |
| THr2 | Rear sensor 11 | | |

*called as such because these threshold values are used to determine whether or not the user who should be regarded as off-board has put both of his or her feet on the board.
**called as such because these threshold values are used to determine whether or not the user who should be regarded as on-board has put at least one of his or her feet off the board.

Figure 7A:
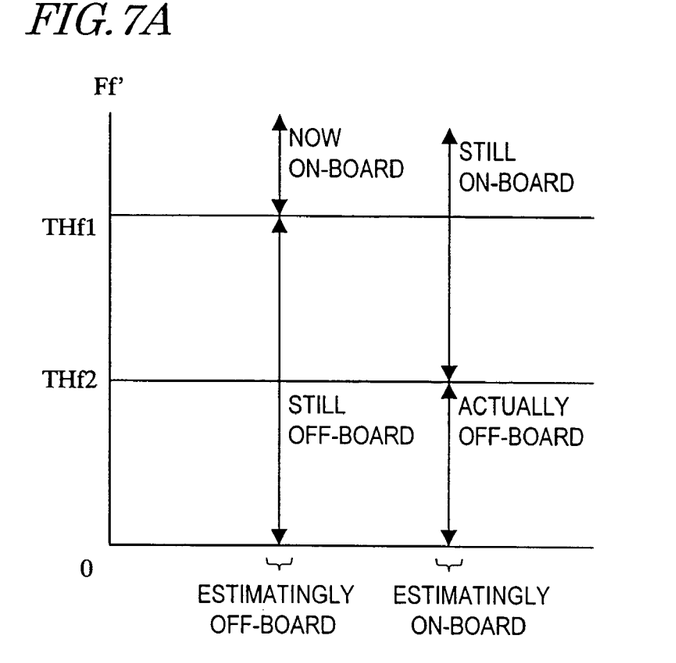
FIG. 7A shows a relationship between threshold values THf1 and THf2.
Figure 7B:
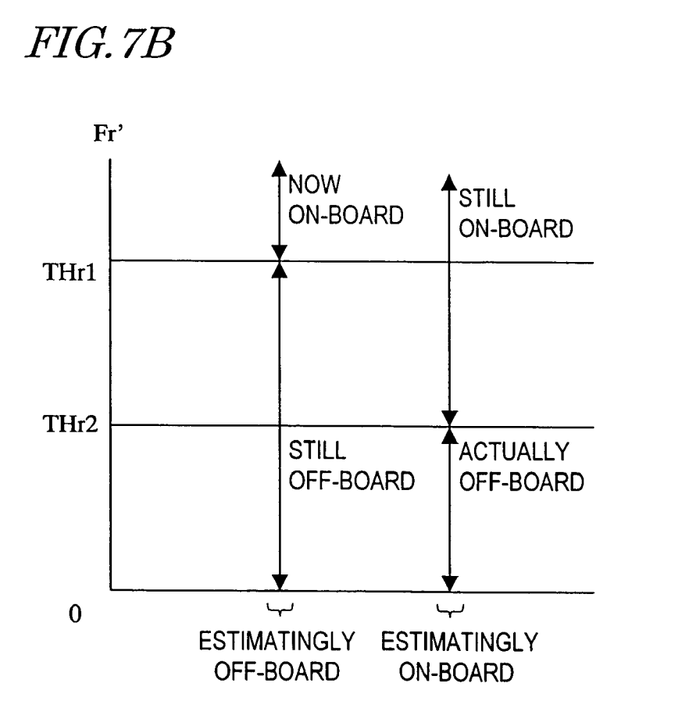
FIG. 7B shows a relationship between threshold values THr1 and THr2.

FIG. 7A shows a relationship between the threshold values THf1 and THf2. It can be seen that the threshold value THf1 used when the user is off-board is set to be greater than the threshold value THf2 used when the user is already on-board. Meanwhile, FIG. 7B shows a relationship between the threshold values THr1 and THr2. The threshold value THr1 is also set to be greater than the threshold value THr2.

However, the individual magnitudes of the threshold values THf1 and THr1 may be appropriately determined. For example, if the motorized skateboard 1 is supposed to be used by at least "10-year-old" kids, those threshold values may correspond to a weight of 15 kg, which is less than a half of the average weight of approximately 34 kg of 10 year olds. Alternatively, the user may set a value that matches his or her own weight by manipulating setting buttons (not shown) that are provided for the motorized skateboard 1. A similar statement applies to the threshold values THf2 and THr2, which may correspond to a weight of 8.5 kg that is approximately a quarter of the average weight of 10 year olds. The threshold values THf1 and THr1 are preferably the same in this preferred embodiment but may be different from each other. Likewise, the threshold values THf2 and THr2 are also supposed to be the same in this preferred embodiment but may be different from each other, too.

Figure 8:
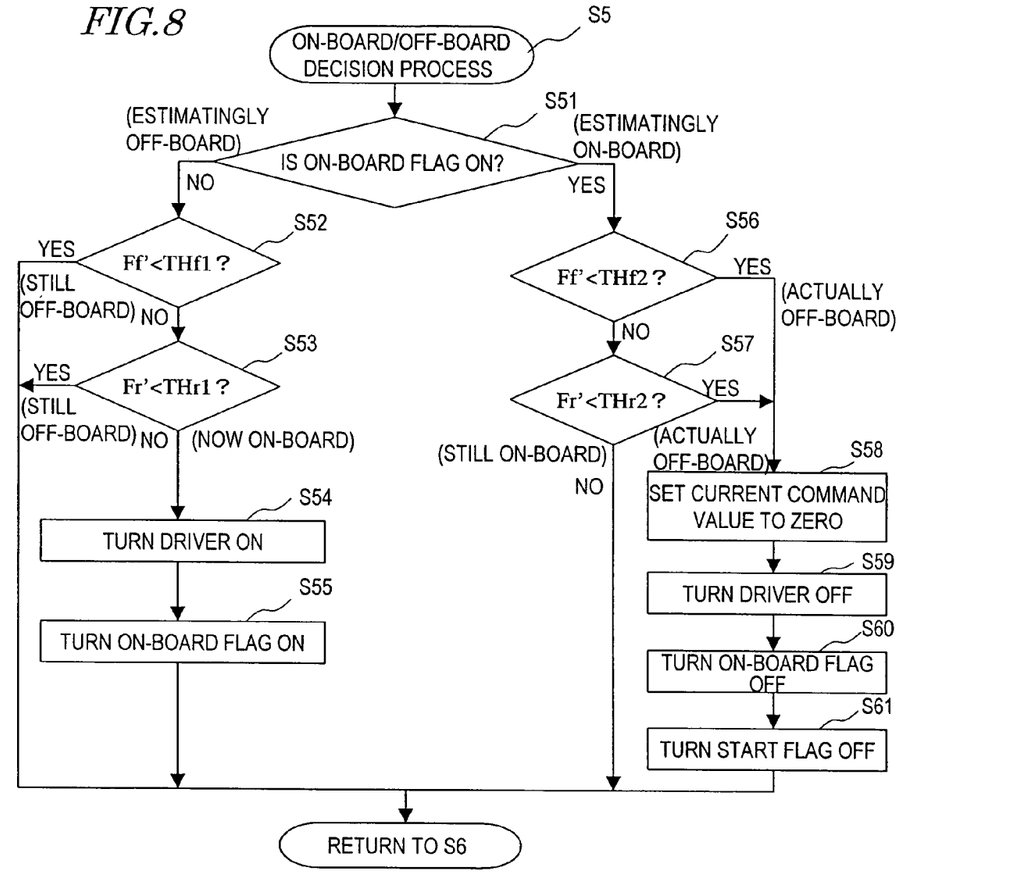
FIG. 8 is a flowchart showing the procedure of an on-board/off-board decision process.

FIG. 8 shows the procedure of the on-board/off-board decision process. First, in Step S51, the CPU 73 determines whether or not the on-board flag is ON. If the answer is NO (i.e., if the user should be regarded as off-board), the CPU 73 performs the processing steps S52 through S55. On the other hand, if the answer is YES, then it means the user is already on-board, and the CPU 73 performs the processing steps S56 through S61.

The series of processing steps S52 through S55 is a process that judges that the user who should have been off-board has just got on-board if the front load value Ff' is equal to or greater than the threshold value THf1 and if the rear load value Fr' is equal to or greater than the threshold value THr1. This means that the user is judged "on-board" only if the user has placed both of his or her feet on the board body 2. As a result, it is possible to avoid an unwanted situation where the motorized skateboard 1 starts abruptly before the user has placed both of his or her feet on the board body 2. On the other hand, if the threshold values do not satisfy these conditions, the processing is carried out with the user still judged "off-board" (i.e., he or she still stays off the skateboard 1).

Hereinafter, these processing steps S52 through S55 will be described more specifically. First, in Step S52, the CPU 73 compares the front load value Ff' with the threshold value THf1 to determine whether or not the front load value Ff' is smaller than the threshold value THf1. If the answer is YES, this decision process ends and the processing step S6 (see FIG. 5A) starts all over again. Otherwise (i.e., if the front load value Ff' is equal to or greater than the threshold value THf1), the process advances to Step S53.

In Step S53, the CPU 73 compares the rear load value Fr' with the threshold value THr1 to determine whether or not the rear load value Fr' is smaller than the threshold value THr1. If the answer is YES, this decision process ends and the processing step S6 (see FIG. 5A) starts all over again. Otherwise (i.e., if the rear load value Fr' is equal to or greater than the threshold value THr1), the process advances to Step S54.

In Step S54, the CPU 73 judges the user already on-board and turns the driver 74 ON. Next, in Step S55, the CPU 73 turns the on-board flag ON. Thereafter, the process returns to the processing step S6 (see FIG. 5A). Since the driver 74 and the on-board flag have been turned ON, the drive motor 76 will start to be driven and the motorized skateboard 1 will start to move when the current command value is calculated after that.

Next, the other series of processing steps S56 through S61 will be described.

The series of processing steps S56 through S61 is a process that judges that the user still stays on the skateboard 1 if the front load value Ff' is equal to or greater than the threshold value THf2 and if the rear load value Fr' is equal to or greater than the threshold value THr2. This means that the user is judged "off-board" if the user has moved at least one of his or her feet off the board body 2. As a result, the user can readily stop the motorized skateboard 1 just by putting one of his or her feet off the skateboard 1. On the other hand, if the threshold values do not satisfy these conditions, the processing is carried out with the user judged already "off-board".

Hereinafter, these processing steps S56 through S61 will be described more specifically. First, in Step S56, the CPU 73 compares the front load value Ff' with the threshold value THf2 to determine whether or not the front load value Ff' is smaller than the threshold value THf2. If the answer is YES, then the user is judged off-board and the process advances to Step S58. Otherwise (i.e., if the front load value Ff' is equal to or greater than the threshold value THf2), the process advances to Step S57.

In Step S57, the CPU 73 compares the rear load value Fr' with the threshold value THr2 to determine whether or not the rear load value Fr' is smaller than the threshold value THr2. If the answer is YES, then the process advances to Step S58. Otherwise (i.e., if the rear load value Fr' is equal to or greater than the threshold value THr2), the CPU 73 judges the user still on-board and the process returns to the processing step S6 (see FIG. 5A).

In Step S58, the CPU 73 judges the user off-board and sets the current command value for the driver 74 equal to or near zero so as to decelerate the skateboard 1. Next, the CPU 73 turns the driver 54 OFF in Step S59, turns the on-board flag OFF in Step S60, and turns the start flag OFF in Step S61. Thereafter, the process returns to the processing step S6 (see FIG. 5A). Since the driver 74 and the on-board flag have been turned OFF, the drive motor 76 is never driven in such a state. As a result, the motorized skateboard 1 gradually decelerates and eventually stops.

A preferred embodiment of the present invention has just been described as being applied to the motorized skateboard 1, of which the configuration and operation are just as described above.

In this preferred embodiment, the threshold value THf1 is set to be greater than the threshold value THf2 and the threshold value THr1 is set to be greater than the threshold value THr2. Accordingly, even if the user who is stepping on the skateboard 1 gives the board body 2 some vibrations, the user is never judged already on-board. Thus, the motorized skateboard 1 never starts abruptly. Likewise, even if a slight load variation has occurred while the user is staying on the board body 2, the user is never judged off-board, either. That is why the motorized skateboard 1 does not stop suddenly. As a result, the user can start and stop the motorized skateboard 1 smoothly.

Furthermore, in the preferred embodiment described above, the ratio of the front or rear load value Ff' or Fr' to the sum of the front and rear load values Ff' and Fr' is calculated as the load ratio W and the current command value is calculated based on this load ratio W. This load ratio W is determined by the distribution of the loads on the front and rear sensors 10 and 11 irrespective of the user's weight. As a result, the acceleration and deceleration of the motorized skateboard 1 can be controlled just as intended, no matter how heavy the user may be.

Furthermore, in the preferred embodiment described above, the front and rear sensors 10 and 11 are preferably provided. Then, the load values detected by these sensors may be used in both the process of controlling the velocity of the motorized skateboard 1 and the process of determining whether the user is on-board or off-board. However, no other sensors but these two sensors 10 and 11 are needed, and the number of necessary parts can be reduced.

Also, although strain gauge load cells are preferably used as the front and rear sensors 10 and 11 in the preferred embodiment described above, the present invention is in no way limited to that specific preferred embodiment. Alternatively, electrostatic capacitance load cells or pressure sensors may also be used instead.

As another alternative, the load may also be sensed by replacing the front and rear sensors 10 and 11 such as load cells for directly sensing the load with a combination of an elastic member such as a spring and a position sensor for sensing the load by detecting the displacement of the elastic member. The load sensing unit 78 (see FIG. 4) may be formed by combining these members together. By adopting such a structure, the cost can be greatly reduced.

Figure 9:
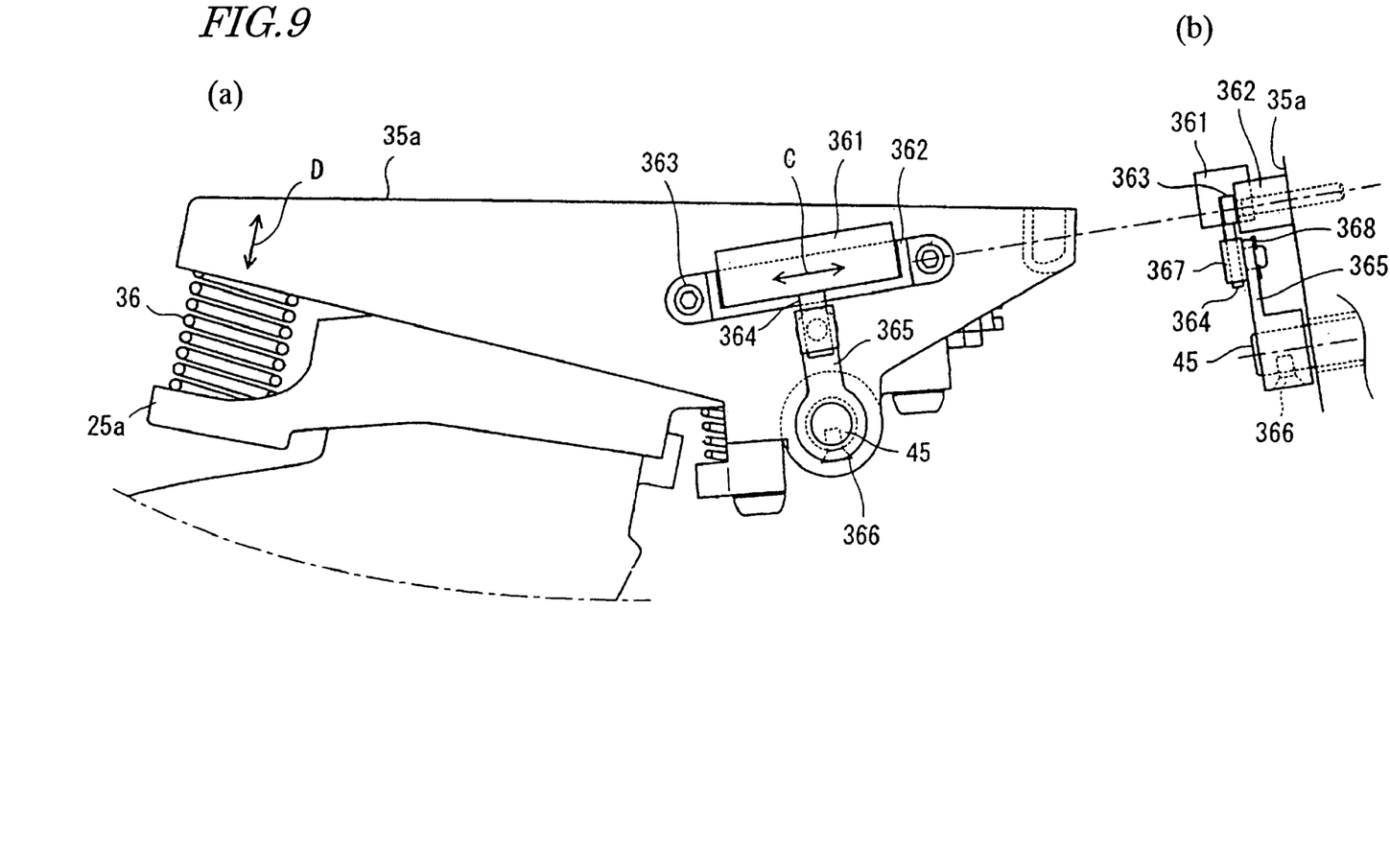
FIG. 9 illustrates a configuration for a load sensing unit that uses a spring and a position sensor.

FIG. 9 illustrates a configuration for a load sensing unit that uses a spring and a position sensor. In this load sensing unit, a frame 35a is attached to the board body 2. The frame 35a and another frame 25a are coupled together via a shaft 45. The spring 36 is inserted between the respective tops of these frames 25a and 35a. The position sensor 361 is supported by a sensor supporting portion 362 that is secured to a side surface of the frame 35a with bolts 363. The position sensor 361 has a slit to allow a strip member 364 to move horizontally therein. By detecting the displacement of the strip member 364 in the sensor length direction (as pointed by the arrow C in portion (a) of FIG. 9) along the slit, the position sensor 361 senses the load being placed on the board 2. Also, one end of a coupling member 365 shaped like a connecting rod is fitted with the end of the shaft 45, which is sticking out of the side surface of the frame 35a. The coupling member 365, shaft 45 and frame 25a are coupled together with a screw 366. It should be noted that the coupling member 365 is not fixed to the frame 35a. A holding member 367 is secured to the other end of the coupling member 365 with fittings 368. The strip member 364 is inserted into the head portion of the holding member 367 so as to be held by the holding member 367.

In such an arrangement, when a load is applied to the board body 2, the frame 35a swings downward around the shaft 45 as pointed by the arrow D, thereby compressing the spring 36. At this point in time, although the coupling member 365 itself does not move, the position sensor 361 does move with the frame 35a. As a result, the strip member 364 displaces in the position sensor 361 in one of the directions pointed by the arrow C. Then, by detecting the magnitude of displacement of the strip member 364 in the sensor length direction, the position sensor 361 can sense the load being placed on the board body 2.

In the preferred embodiment described above, the front wheel 3 is supposed to be a free wheel and the rear wheel 4 is supposed to be a driving wheel. However, this is just an example. That is why the front wheel 3 and rear wheel 4 may be used as a driving wheel and a free wheel, respectively, or the front and rear wheels 3 and 4 may be both driving wheels. In the latter case, at least a driver and a drive motor for controlling the drive of the front wheel 3 and another driver and another drive motor for controlling the drive of the rear wheel 4 are needed. These two drive systems need to be controlled independently of each other. In such an alternative preferred embodiment, only one CPU may be provided for the two systems or one CPU may be provided for each driver. Optionally, a motor control unit including a CPU, a driver and a memory may even be provided for each of the front and rear wheels 3 and 4.

The motorized skateboard 1 has been described as a preferred embodiment of the present invention. In the motorized skateboard 1 described above, the board body 2 thereof preferably has an elongated board shape. However, the board body 2 does not always have to be such a flat plate but may have a somewhat curved surface.

Also, the basic concept of the present invention is equally applicable to a motorized surfboard, a motorized wheelchair or any other vehicle with an electrical power source. Furthermore, the power source does not have to be an electric motor but may also be an internal combustion engine. If the present invention is carried out using an internal combustion engine, then the current command value may be replaced with a command value for controlling an opening amount of a throttle and the drive current for the drive motor 76 may be a drive current for a drive motor that drives the throttle.

It should be noted that the processing by the CPU 73 does not always have to be done on the motorized skateboard 1.

A motor control unit according to a preferred embodiment of the present invention and a vehicle including the motor control unit can perform the processing described above according to a computer program. The computer program may be described based on the flowchart shown in FIGS. 5A and 5B or FIG. 8 and is preferably carried out by a CPU. The computer program may be stored in any of various types of storage media. Examples of preferred storage media include optical storage media such as optical disks, semiconductor storage media such as an SD memory card and an EEPROM, and magnetic recording media such as a flexible disk. Such a computer program may be circulated on the market by being either stored on a storage medium or downloaded via a telecommunications line (e.g., through the Internet).

The present invention is effectively applicable for use as a control unit for controlling a vehicle such as a motorized skateboard and as a vehicle including such a control unit.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-228942 filed on Aug. 5, 2004, and No. 2004-268085 filed on Sep. 15, 2004, the entire contents of which are hereby incorporated by reference.

What is claimed is:

1. A control unit for controlling a vehicle, the vehicle including a body to allow a user to step on, a power generator arranged to generate power that drives the body and a load sensor unit arranged to output a load value representing a load that has been applied to the body, the control unit comprising:
a first memory arranged to store a load threshold value;
a second memory arranged to store a plurality of data, which respectively correspond to different types of control processing to control the power generator; and
a processor arranged to change to a type of control processing among the different types of control processing according to a result of a comparison between the load value and the load threshold value; where
the processor controls the power generator based on one of the plurality of data corresponding to the types of control processing.

2. The control unit of claim 1, wherein the power generator of the vehicle generates power in accordance with a command value, and the processor outputs the command value based on the data corresponding to the type of control processing after the type of control processing has been changed.

3. The control unit of claim 2, wherein the processor changes to the type of control processing for generating the power and outputs a command value that is different from another command value associated with a stopped state of the vehicle.

4. The control unit of claim 3, wherein the command value output by the processor changes in a stepwise manner.

5. The control unit of claim 2, wherein the processor changes to the type of control processing for stopping generation of the power and outputs a command value associated with a stopped state of the vehicle.

6. The control unit of claim 2, wherein the first memory stores a step-on-board threshold value as the load threshold value, and when the load value exceeds the step-on-board threshold value, the processor changes to the type of control processing for generating the power.

7. The control unit of claim 6, wherein the first memory further stores a step-off-board threshold value that is smaller than the step-on-board threshold value, and when the load value becomes smaller than the step-off-board threshold value, the processor changes to the type of control processing for stopping generation of the power.

8. The control unit of claim 1, wherein the load sensor unit includes a plurality of sensors disposed at mutually different positions on the body so as to output load values representing loads at the respective positions, the first memory stores a plurality of load threshold values that are defined for the respective sensors, and the processor compares the load value supplied from each of the sensors with an associated one of the load threshold values.

9. The control unit of claim 8, wherein the first memory stores first and second step-on-board threshold values as the load threshold values, the load sensor unit includes a first sensor and a second sensor, and when it is determined that the load value detected by the first sensor exceeds the first step-on-board threshold value and it is determined that the load value detected by the second sensor exceeds the second step-on-board threshold value as a result of the comparison, the processor changes to the type of control processing for generating the power.

10. The control unit of claim 8, wherein the first memory stores first and second step-off-board threshold values as the load threshold values, the load sensor unit includes a first sensor and a second sensor, and when it is determined that the load value detected by the first sensor is equal to or smaller than the first step-off-board threshold value and/or it is determined that the load value detected by the second sensor is equal to or smaller than the second step-off-board threshold value as a result of the comparison, the processor changes to the type of control processing for stopping generation of the power.

11. The control unit of claim 9, wherein the power generator of the vehicle drives the body in a direction and at a velocity as determined by the command value, and the processor calculates a bias of the loads based on the load values that have been detected by the first and second sensors and changes the command value according to the bias.

12. A vehicle including:
a body arranged to allow a user to step on;
a power generator arranged to generate power that drives the body;
a load sensor unit mounted on the body and arranged to output a load value representing a load that has been applied to the body; and
a control unit, wherein the control unit includes:
a first memory arranged to store a load threshold value;
a second memory arranged to store a plurality of data, which respectively correspond to different types of control processing to control the power generator; and
a processor arranged to change to a type of control processing among the different types of control processing according to a result of a comparison between the load value and the load threshold value; wherein
the processor controls the power generator based on one of the plurality of data corresponding to the type of control processing.

13. The vehicle of claim 12, further comprising a first wheel and a second wheel that support the body, wherein at least one of the first and second wheels is dynamically coupled to the power generator.

14. The vehicle of claim 13, wherein the body has a board shape and is elongated in a direction in which the first and second wheels are arranged.

15. The vehicle of claim 14, wherein the first and second wheels are arranged so as to face each other with respect to an approximate center of the body.

16. The vehicle of claim 15, wherein the power generator drives the body in the direction in which the first and second wheels are arranged.

17. The vehicle of claim 13, wherein the vehicle is a skateboard.

* * * * *